(12) United States Patent
Eley et al.

(10) Patent No.: US 12,540,896 B2
(45) Date of Patent: Feb. 3, 2026

(54) METHOD AND SPECIMEN FOR EVALUATING CORROSION PROTECTION OF A SUBSTRATE

(71) Applicant: BAE Systems plc, London (GB)

(72) Inventors: Rebecka Eley, Bristol (GB); Mark David Balmond, Bristol (GB); Christopher Colin Figgures, Bristol (GB); Ian Michael Sturland, Bristol (GB); Simon Robert Church, Monmouth (GB)

(73) Assignee: BAE Systems plc, London (GB)

( * ) Notice: Subject to any disclaimer, the term of this patent is extended or adjusted under 35 U.S.C. 154(b) by 291 days.

(21) Appl. No.: 17/927,621

(22) PCT Filed: May 26, 2021

(86) PCT No.: PCT/GB2021/051277
§ 371 (c)(1),
(2) Date: Nov. 23, 2022

(87) PCT Pub. No.: WO2021/240151
PCT Pub. Date: Dec. 2, 2021

(65) Prior Publication Data
US 2023/0168181 A1    Jun. 1, 2023

(30) Foreign Application Priority Data
May 27, 2020  (EP) ..................................... 20275097
May 27, 2020  (GB) ..................................... 2007878

(51) Int. Cl.
*G01N 17/04*   (2006.01)
*C23C 8/10*    (2006.01)
(Continued)

(52) U.S. Cl.
CPC ............... *G01N 17/04* (2013.01); *C23C 8/10* (2013.01); *C25D 11/02* (2013.01); *G01N 17/006* (2013.01); *G01N 17/043* (2013.01); *C25D 11/04* (2013.01)

(58) Field of Classification Search
CPC .... G01N 17/04; G01N 17/006; G01N 17/043; C23C 8/10; C25D 11/04; C25D 11/02
See application file for complete search history.

(56) References Cited

U.S. PATENT DOCUMENTS

| 4,452,856 A | * | 6/1984 | Lovell ..................... C23F 15/00 |
|---|---|---|---|
| | | | 428/319.3 |
| 2007/0220946 A1 | | 9/2007 | Pecina |

(Continued)

FOREIGN PATENT DOCUMENTS

| EP | 1750123 A2 | 2/2007 | |
|---|---|---|---|
| EP | 2306175 A1 * | 4/2011 | ............. G01N 17/04 |

(Continued)

OTHER PUBLICATIONS

Li Duanjie et al., "Corrosion Resistance of Coating After Scratch Testing", Technical Report—Apr. 21, 2016, pp. 1-10, XP093217328, DOI: 10.13140/RG.2.1.1566.7606.*

(Continued)

*Primary Examiner* — Helen C Kwok
(74) *Attorney, Agent, or Firm* — Maine Cernota & Curran

(57) ABSTRACT

Specimens and methods are described for evaluating corrosion protection of substrates due, at least in part, to coatings applied thereupon. A specimen (1) is provided with: a first coating (10), with a first set of layers (11) including a first layer (11A), on a first substrate (12); and a first set of perforations (100), including a first perforation (100A) and a second perforation (100B), in the first coating (10), wherein the first perforation (100A) has a first depth D1 through the first coating (10) and a first dimension W1

(Continued)

transverse to the first depth, wherein the second perforation (100B) has a second depth D2 through the first coating (10) and a second dimension W2 transverse to the second depth D2 and wherein the first dimension W1 and the second dimension W2 are different

15 Claims, 5 Drawing Sheets

(51) Int. Cl.
  *C25D 11/02* (2006.01)
  *C25D 11/04* (2006.01)
  *G01N 17/00* (2006.01)

(56) References Cited

U.S. PATENT DOCUMENTS

| | | | |
|---|---|---|---|
| 2009/0068060 A1* | 3/2009 | Alfermann | G01N 17/04 |
| | | | 422/53 |
| 2011/0187395 A1* | 8/2011 | Morgan | G01N 17/04 |
| | | | 324/700 |
| 2014/0283619 A1* | 9/2014 | Sugano | G01N 3/32 |
| | | | 73/799 |
| 2015/0060273 A1* | 3/2015 | Zhang | G01N 27/02 |
| | | | 204/404 |
| 2015/0204776 A1* | 7/2015 | Balmond | G01R 27/08 |
| | | | 324/700 |
| 2016/0363525 A1* | 12/2016 | Friedersdorf | G01N 27/023 |
| 2017/0350808 A1* | 12/2017 | Balmond | B32B 38/0008 |

FOREIGN PATENT DOCUMENTS

| | | | |
|---|---|---|---|
| GB | 2368914 A | | 5/2002 |
| JP | 2011169882 A | * | 9/2011 |
| WO | 2009141639 A1 | | 11/2009 |
| WO | 2011042716 A1 | | 4/2011 |

OTHER PUBLICATIONS

International Search Report and Written Opinion for PCT Appl. No. PCT/GB2021/051277 mail date Aug. 2, 2021, 12 pages.
International Preliminary Report on Patentability for PCT Appl. No. PCT/GB2021/051277 mail date Dec. 8, 2022, 9 pages.
Extended European Search Report for EP Patent Appl. No. 20275097.2 mail date Nov. 24, 2020, 8 pages.
GB Search Report for Patent Appl. No. GB2007878.8 mail date Sep. 14, 2020, 3 pages.
Journal of Failure Analysis and Prevention, vol. 18, Issue 6, 2018, "Maples et al., Understanding Scribe Profile and Tool Type Effects on Visual Corrosion Assessments", pp. 1401-1410. see pp. 1402 & 1403.
Products Finishing, Ackerson, 2015, "Scrating the Surface on Corrosion Testing of Automotive Coatings" [online]. Available from: https://www.pfonline.com/articles/scratching-the-surface-on-corrosion-testing-of-automotive-coatings [Accessed Nov. 9, 2020] see pp. 1-4 & 7.

* cited by examiner

METHOD AND SPECIMEN FOR EVALUATING CORROSION PROTECTION OF A SUBSTRATE

RELATED APPLICATIONS

This application is a national phase application filed under 35 USC § 371 of PCT Application No. PCT/GB2021/051277 with an international filing date of May 26, 2021, which claims priority of GB Patent Application 2007878.8 filed May 27, 2020 and EP Patent Application 20275097.2 filed May 27, 2020. All of these applications are incorporated herein by reference in their entirety for all purposes.

FIELD

The present invention relates to evaluating corrosion protection of substrates due, at least in part, to coatings applied thereupon.

BACKGROUND TO THE INVENTION

Corrosion of metals used in aircraft structures is an extensive and expensive problem for the aerospace industry, demanding an estimated annual cost in excess of $2 billion, including an estimated $1.7 billion for corrosion maintenance. Despite this large cost on corrosion maintenance, corrosion remains a common cause of damage to metal components and accounts for about 25% of all metal component failures on aircraft—only fatigue is responsible for more failures.

Test methods have been standardised for the evaluation of painted or coated metals. For example, ASTM D1654-08 (2016)e1 *Standard Test Method for Evaluation of Painted or Coated Specimens Subjected to Corrosive Environments* covers the treatment of previously painted or coated (generally, coated) specimens for accelerated and atmospheric exposure tests and their subsequent evaluation in respect of corrosion, blistering associated with corrosion, loss of adhesion at a scribe mark, or other film failure. Particularly, this standard test method provides a means of evaluating and comparing basic corrosion performance of a substrate, pretreatment, or coating system, or combination thereof, after exposure to corrosive environments. The specimens are scribed using a scribing tool to obtain uniform V-cuts through the coating that is being tested. The scribe must penetrate all organic coating layers on a metal specimen, leaving a uniformly bright line. The extent of scribe penetration through metal coatings, such as galvanise, should be agreed. A length of a scribed line should be sufficient to cover the length of a test area of a specimen. Generally, a single straight line is scribed on a specimen. The scribed specimens are then exposed, for example according to ASTM B117-19 Standard Practice for Operating Salt Spray (Fog) Apparatus. After exposure, for example for about 2,000 hours, the scribed specimens are evaluated for rust or corrosion creepage, in which the coating is removed along scribed lines and corrosion of the first substrate observed thereunder. That is, rust creepage or undercutting from the scribed lines under the coating is observed. Areas of the first substrate that are discoloured due to corrosion are rated by measuring maximum and minimum creepage from the scribed lines. The arithmetic mean of at least six measurements of the width of the corrosion zone is calculated and rust creepage c determined by:

$$c = \frac{w_c - w}{2}$$

where
$w_c$ is the mean overall width of the corrosion zone, and
w is the width of the original scribed line.

A rust creepage c=0 mm corresponds with a rating number 10, a rust creepage 3.0 mm<c≤5.0 mm corresponds with a rating number 5 and a rust creepage c≥16.0 mm corresponds with a rating number 0, for example.

However, a problem with such test methods is that many coatings may pass such that it is very difficult to determine which coating provides the best level of corrosion protection.

Hence, there is a need to improve evaluating corrosion protection of substrates due, at least in part, to coatings applied thereupon.

SUMMARY OF THE INVENTION

It is one aim of the present invention, amongst others, to provide a method of evaluating corrosion protection of substrates due, at least in part, to coatings applied thereupon which at least partially obviates or mitigates at least some of the disadvantages of the prior art, whether identified herein or elsewhere. For instance, it is an aim of embodiments of the invention to provide a method that better distinguishes between the corrosion protection due to different coatings. For instance, it is an aim of embodiments of the invention to provide a specimen that allows a more quantitative evaluation of corrosion protection.

A first aspect provides a method of evaluating corrosion protection of substrates due, at least in part, to coatings applied thereupon, the method comprising: preparing a first specimen comprising:
  applying a first coating, comprising a first set of layers including a first layer, on a first substrate; and
  providing a first set of perforations, including a first perforation and a second perforation, in the first coating, wherein the first perforation has a first depth through the first coating and a first dimension transverse to the first depth, wherein the second perforation has a second depth through the first coating and a second dimension transverse to the second depth and wherein the first dimension and the second dimension are different;
  exposing the first specimen to a first corrosive environment; and
  determining corrosion in the first set of perforations.

A second aspect provides a specimen for evaluating corrosion protection of substrates due, at least in part, to coatings applied thereupon, the specimen comprising:
  a first coating, comprising a first set of layers including a first layer, on a first substrate; and
  a first set of perforations, including a first perforation and a second perforation, in the first coating, wherein the first perforation has a first depth through the first coating and a first dimension transverse to the first depth, wherein the second perforation has a second depth through the first coating and a second dimension transverse to the second depth and wherein the first dimension and the second dimension are different.

DETAILED DESCRIPTION OF THE INVENTION

According to the present invention there is provided a method, as set forth in the appended claims. Also provided is a specimen. Other features of the invention will be apparent from the dependent claims, and the description that follows.

Method

The first aspect provides a method of evaluating corrosion protection of substrates due, at least in part, to coatings applied thereupon, the method comprising: preparing a first specimen comprising:

applying a first coating, comprising a first set of layers including a first layer, on a first substrate; and providing a first set of perforations, including a first perforation and a second perforation, in the first coating, wherein the first perforation has a first depth through the first coating and a first dimension transverse to the first depth, wherein the second perforation has a second depth through the first coating and a second dimension transverse to the second depth and wherein the first dimension and the second dimension are different;

exposing the first specimen to a first corrosive environment; and determining corrosion in the first set of perforations.

That is, the first and second perforations of the first set of perforations, having different first and second dimensions (for example, widths or diameters) respectively, are provided in the first coating of the first specimen. The first specimen is then exposed to the first corrosive environment and corrosion is determined, for example after the exposing, in the first and second perforations. It should be understood that corrosion is determined in the first and second perforations, rather than, for example, underlying the first coating adjacent thereto c.f. evaluation of rust creepage according to ASTM B1117-19. That is, corrosion of the first substrate, particularly pitting corrosion of the first substrate, within the first and second perforations is determined. In this way, by determining corrosion in the first set of perforations, evaluation of corrosion protection of substrates due, at least in part, to different coatings may be improved, allowing qualitative and/or quantitative assessment of corrosion protection due, at least in part, to the coatings.

In this way, the method provides endpoint detection during the evaluation in order to allow quantitation assessment of the corrosion protection performance of the coatings.

Method

The method is of evaluating corrosion protection of substrates due, at least in part, to coatings applied thereupon.

It should be understood that the method of evaluating corrosion protection does not comprise and is not a resistive method of determining corrosion protection, typically used for in situ measurements. Similarly, the specimen according to the second aspect does not comprise and is not a resistive corrosion sensor.

For example, a known resistive corrosion sensor comprises a patterned conductive thin film provided on a substrate, in which the thin film is of a material, typically a metal, having corrosion characteristics representative of that of a metal of a structure on which the corrosion sensor is mounted. The corrosion sensor defines a set of sensing elements, for example linear or serpentine sensing elements, extending between common terminals, wherein the respective sensing elements are thus in parallel. A coating, for example paint optionally including a corrosion inhibitor, is provided over the substrate and the sensing elements. The initial overall resistance of the corrosion sensor (i.e. before the action of corrosive media) is determined, at least in part, by the resistivity of the conductive thin film and the respective lengths and cross-sectional areas of the sensing elements. The resistivity is predetermined by the selection of material for the conductive thin film, which is selected according to the metal of the structure on which the corrosion sensor is mounted. Generally, the action of corrosive media on the sensing elements increases the overall resistance thereof, as measured between the common terminals. The measured increase in overall resistance may be related to the effects of corrosion of the metal of the structure on which the corrosion sensor is mounted. However, the measured increase in overall resistance is non-specific and if related to the effects of corrosion of the metal of the structure on which the corrosion sensor, may be due to atmospheric corrosion, erosion corrosion, selective corrosion, uniform corrosion, pitting corrosion, fretting corrosion, stress corrosion, inter-granular corrosion and/or corrosion fatigue. In contrast, the method according to the first aspect and the specimen according to the second aspect relate specifically to pitting corrosion.

Substrates

The method is applicable to ferrous and non-ferrous substrates.

Coatings

Preparing Specimens

The method comprises preparing the first specimen. Generally, specimens are also known as test specimens, coupons or test coupons, panels or test panels, samples or test samples. In one example, the first specimen is of a set of specimens including N specimens, where N is a natural number greater than or equal to 1, for example 1, 2, 3, 4, 5, 6, 7, 8, 9, 10 or more. Particularly, a plurality of specimens may be prepared, substantially similar or identical to the first specimen, wherein each specimen is exposed for a different duration to the first corrosive environment. In this way, the corrosion protection of the first substrate due, at least in part, to the first coating applied thereupon may be evaluated as a function of time. Additionally and/or alternatively, a plurality of specimens may be prepared, substantially similar or identical to the first specimen but having different coatings applied thereupon, wherein each specimen is exposed for the same duration to the first corrosive environment. In this way, the corrosion protection of the first substrate due, at least in part, to different coatings applied thereupon may be evaluated. Additionally and/or alternatively, a plurality of specimens may be prepared, substantially similar or identical to the first specimen, where in each specimen is exposed for the same duration to a different corrosive environment. In this way, the corrosion protection of the first substrate due, at least in part to the first coating applied thereupon may be evaluated for different corrosive environments.

First Substrate

In one example, the first substrate comprises and/or is a metal or an alloy, for example a ferrous, such as a low alloy steel or a stainless steel, or a non-ferrous alloy, such as an aluminium alloy, a cobalt alloy, a nickel alloy or a titanium alloy.

In one example, the first substrate comprises and/or is an aluminium alloy, for example a 1000 series, a 2000 series, a 3000 series, a 4000 series, a 5000 series, a 6000 series, a 7000 series, a 8000 series aluminium alloy, preferably a 2000 series, a 5000 series, a 6000 series or a 7000 series aluminium alloy, more preferably a 2000 series or a 7000 series aluminium alloy, having any applicable temper designation (i.e. -F, -H, -H1, -H2, -H3, -HX2, -HX4, -HX6, -HX8, -HX9, -O, -T, -T1, -T2, -T3, -T4, -T5, -T51, -T510, -T511, -T52, -T6, -T7, -T8, -T9, -T10, -W).

In one example, the aluminium alloy is an aerospace aluminium alloy selected from: 1420, 2004, 2014, 2017, 2020, 2024, 2080, 2090, 2091, 2095, 2124, 2219, 2224, 2324, 2519, 2524, 4047, 6013, 6061, 6063, 6113, 6951, 7010, 7049, 7050, 7055, 7068, 7075, 7079, 7093, 7150, 7178, 7475 and 8009.

In one example, the aluminium alloy is a marine aluminium alloy selected from: 5052, 5059, 5083, 5086, 6061 and 6063.

First Coating

The first coating comprises the first set of layers including a first layer. It should be understood that the purpose of the first coating is to provide corrosion protection for the first substrate. Suitable coatings for different substrates are known. A brief overview is provided of coatings for aluminium alloys.

Corrosion protection of aluminium alloys is typically a multistep treatment process including pre-treatment processes, such as anodising, followed by application of conversion coatings and/or organic coatings (barrier and inhibitor combinations), to give a multi-layered coating. For example, a typical multistep treatment process comprises:
1. selective deoxidation, for intermetallic (IM) particle removal and surface etching, to improve adherence of coatings to the surface and may provide some corrosion protection,
2. deposition or growth of a manufactured oxide via electrochemical (anodising) or chemical (conversion coating) means; and
3. use of an organic coating for specific applications, normally including, but not limited to, a primer and a top-coat.

Anodised coating processes for aluminium alloys typically produce an outer oxide having a cellular structure on top of a thin barrier layer that provides some protection against corrosion. Inhibitors maybe included in the outer porous layer of the anodized layer during formation or as a seal after formation to offer some extra protection upon damage. Processes for electrochemical growth of surface protective oxides include chromic acid anodizing while more environmentally-friendly alternatives such as sulfuric, sulfuric-boric, sulphuric-tartaric and phosphoric based processes maybe preferred.

Conversion coatings are an alternative to anodizing, in which a coating is chemically precipitated on the surface. For high strength aluminium alloys, such as 2000 and 7000 series aluminium alloys, chromate conversion coating (CrCC or CCC) is the preferred process. Replacements for the toxic chromate-based conversion coatings include a range of treatments based on self-assembled monolayers, sol-gel chemistries, Ti/Zr oxyfluorides, rare earth, cobalt, vanadates, molybdates and permanganate processes.

After anodising or conversion coating, an organic coating is typically applied. Many organic coatings are known and described herein are organic coatings suitable for high strength aluminium alloys, such as 2000 and 7000 series aluminium alloys. The organic coating usually includes a primer, a topcoat and optionally, one or more intermediate coats. The primer layer is the main corrosion protective layer and includes corrosion inhibitors that are released when corrosive species or water reach the aluminium alloy. In order to provide corrosion protection to the aluminium alloy, the inhibitor should be provided during a corrosion event at a concentration higher than the minimum concentration at which the inhibitor stops corrosion (critical concentration). This is important because the critical concentration of the inhibitor in the primer must be maintained during the service life of structures such as airframes, where maintenance may not be practicable due to inaccessibility. Chromate inhibitors provide continuous protection and repair to the surface of the aluminium alloy while the chromate remains above the critical concentration. This mechanism of inhibitor release and metal protection may be termed a self-healing mechanism, since the release of the active species recovers the protective layer on top of the metal. Other inhibitors are known. The topcoat and optional intermediate coats provide physical barriers; the topcoat may provide an impervious layer.

In one example, the first layer comprises a first inhibitor, as described above. That is, the first layer may be a primer, for example.

Example primers include PPG PR205 and PPG PR143. Other primers are known.

In one example, the first set of layers includes a zeroth layer, for example underlying the first layer, such as an anodising or conversion layer, for example a chromic acid anodising layer or an Alocrom or Alodine conversion coating.

In one example, the first set of layers includes a second layer, for example overlaying the first layer such as an intermediate coat or a topcoat.

Example topcoats include PPG EC75 and PPG CA8311. Other topcoats are known.

In one example, the first set of layers includes a zeroth layer, such as an anodising or conversion layer, for example a chromic acid anodising layer or an Alocrom conversion coating, the first layer, such as a primer, and a second layer, such as an intermediate coat or a topcoat.

Applying Coating

Preparing the first specimen comprises applying the first coating, comprising the first set of layers including a first layer, on the first substrate. It should be understood that the first coating is applied to a surface, for example an outer surface, of the first substrate.

Methods of applying the first coating on the first substrate are known.

In one example, applying the first coating comprises applying the first layer directly on the first substrate, for example without any interlayers therebetween.

In one example, the first set of layers includes a zeroth layer, such as an anodising or conversion layer, for example a chromic acid anodising layer or an Alocrom conversion coating, and wherein applying the first coating comprises applying the zeroth layer on the first substrate, for example directly on the first substrate, and applying the first layer on the zeroth layer, for example directly on the zeroth layer, wherein the zeroth layer underlays the first layer.

In one example, the first set of layers includes a second layer, such as an intermediate coat or a topcoat, and wherein applying the first coating comprises applying the second layer on the first layer, for example directly on the first layer, wherein the second layer overlays the first layer.

In one example, the first set of layers includes a zeroth layer, such as an anodising or conversion layer, for example a chromic acid anodising layer or a Alocrom conversion coating, the first layer, such as a primer, and a second layer, such as an intermediate coat or a topcoat, wherein applying the first coating comprises applying the zeroth layer on the first substrate, for example directly on the first substrate, applying the first layer on the zeroth layer, for example directly on the zeroth layer, wherein the zeroth layer underlays the first layer, and applying the second layer on the first layer, for example directly on the first layer, wherein the second layer overlays the first layer.

In one example, applying the first coating comprises curing the first coating.

In one example, preparing the first specimen comprises providing a flat surface on the first substrate, for example by machining such as milling or grinding, and wherein applying the first coating on the first substrate comprises applying the first coating on the flat surface provided on the first substrate. In this way, the set of perforations may reveal the flat surface.

Providing Set of Perforations

Preparing the first specimen comprising providing the first set of perforations, including the first perforation and the second perforation, in the first coating. That is, the first set of perforations is provided in (i.e. through such as partly or fully through) the first coating. It should be understood that the first set of perforations is generally similar, for example the first perforation and the second perforation are generally similar, such as with respect to shape but have different dimensions transverse to their respective depths. That is, a plurality of perforations is provided in the first specimen. In this way, the plurality of perforations is exposed to the same first corrosive environment, for example simultaneously. In this way, evaluation of corrosion protection is improved because multiple tests are thus performed simultaneously, yielding more data points.

In one example, providing the first set of perforations comprises machining, at least in part, the first perforation in the first coating after applying the first coating on the first substrate. That is, the first set of perforations is machined in the applied first coating. In one example, machining, at least in part the first perforation in the first coating comprises scribing, milling, turning and/or cutting the first coating, for example using a tool. Suitable tools are known. Machining may be suitable for relatively smaller perforations.

In one example, providing the first set of perforations comprises, at least in part, masking the first substrate using a first mask before applying the first coating on the first substrate and removing the first mask thereafter. That is, the first set of perforations is defined by the first mask. Masking may be suitable for relatively larger perforations.

The first perforation has the first depth through the first coating and the first dimension transverse, for example orthogonal, to the first depth. It should be understood that the first dimension is a lateral dimension of the first perforation, for example a width or a diameter c.f. a length. In one example, the first perforation extends through the first layer of the first set of layers of the first coating, for example fully through the first layer, whereby the first depth corresponds with (i.e. is equal to) a thickness of the first layer. In one example, the first perforation extends through the first set of layers of the first coating, for example fully through the first set of layers of the first coating, thereby revealing the first substrate (i.e. uncovering the first substrate), whereby the first depth corresponds with a thickness of the first coating. In one example, the first set of layers includes a zeroth layer, such as an anodising or conversion layer, and the first perforation extends through the first layer, thereby revealing the zeroth layer, whereby the first depth corresponds with a thickness of the remaining layers. That is, the first depth may be defined as that depth through the first coating required to reveal a desired layer, such as the zeroth layer, or the first substrate.

The second perforation has the second depth through the first coating and the second dimension transverse to the second depth. The second perforation may be generally as described with respect to the first perforation. In one preferred example, the second depth corresponds with the first depth i.e. the second depth is equal to the first depth.

The first dimension and the second dimension are different. By having different first and second dimensions, corrosion protection of the first substrate due, at least in part, to the first coating may be evaluated as a function of distance from the first coating. For example, if the second dimension is greater than the first dimension, corrosion protection of the first substrate due, at least in part, to the first coating may be relatively greater at a first position (e.g. a midpoint) relatively more proximal the first coating in the first perforation compared with a second position (e.g. a midpoint) relatively more distal the first coating in the second perforation.

In one example, the first set of perforations includes P perforations, where P is a natural number greater than or equal to 2, for example 2, 3, 4, 5, 6, 7, 8, 9, 10 or more. Each perforation of the first set of perforations may be as described with respect to the first perforation but having different dimensions transverse to their respective depths.

In one example, providing the first set of perforations comprises revealing, at least in part, the first substrate. That is, the first substrate is directly exposed to the corrosive environment. Since the set of perforations is provided in the first coating, edges of the first set of layers of the first coating are also similarly revealed.

In one example, the first set of layers includes a zeroth layer and wherein providing the first set of perforations comprises revealing, at least in part, the zeroth layer. That is, the zeroth layer is directly exposed to the corrosive environment.

In one example, providing the first set of perforations comprises providing the first perforation as a first channel in the first coating, wherein the first dimension is a width of the first channel. That is, channels (i.e. slots or troughs or grooves or lines) are provided in the first coating. It should be understood that the width of the first channel is measured at a base thereof. In one example, the first channel has a constant first dimension along a length thereof. In one example, the first channel is a linear channel (i.e. a straight line). In one example, the first channel has a planar base (i.e. a flat bottom) c.f. a scribed V groove. In this way, quantitative evaluation of corrosion protection is improved. In one example, a cross-sectional shape of the first channel is a quadrilateral, preferably a regular quadrilateral, such as a square, a rectangle or an isosceles trapezium. If the cross-sectional shape of the first channel is an isosceles trapezium, walls of the first channel taper outwards away from the base. In one example, the first channel has a cuboidal or a trapezoidal shape. In one example, a length of the first channel is significantly greater than the width of the first channel, for example wherein the length is at least a factor 5, preferably at least a factor 10, more preferably at least a factor 25, most preferably at least a factor 50 greater than the width of the first channel. In one example, a length of the first channel corresponds with (i.e. equal to) a length of the second channel. In one example, the lengths of each channel are the same.

In one example, providing the first set of perforations comprises providing the first perforation as a first bore in the first coating, wherein the first dimension is a diameter of the first bore. That is, bores (i.e. wells) are provided in the first coating. It should be understood that the diameter of the first bore is measured at a base thereof. In one example, the first bore has a planar base (i.e. a flat bottom). In one example, a cross-sectional shape of the first bore is a quadrilateral, preferably a regular quadrilateral, such as a square, a rectangle or an isosceles trapezium. If the cross-sectional shape of the first bore is an isosceles trapezium, walls of the first bore taper outwards away from the base. In one example, the first bore has a cylindrical or a frustoconical shape.

In one example, the first dimension is in a range from 0.1 mm to 25 mm, preferably in a range from 0.2 mm to 10 mm, more preferably in a range from 0.5 mm to 5.0 mm, for example 0.6 mm, 0.8 mm, 1.0 mm, 2.0 mm, 3.0 mm or 4.0 mm. In this way, evaluation of the corrosion protection may be accelerated because corrosion in relatively large perforations is monitored.

In one example, the respective dimensions, transverse to the respective depths, of the first set of perforations are described, at least in part, by an arithmetic progression and/or a geometric progression. In this way, quantitative evaluation of the corrosion protection is improved.

In one example, the first set of perforations is mutually spaced apart, for example mutually equispaced. In one example, a spacing between the first perforation and the second perforation is at least a factor S greater than the first dimension, wherein S is a natural number greater than or equal to 2, for example 2, 3, 4, 5, 6, 7, 8, 9, 10 or more. In this way, the first coating between the first perforation and the second perforation includes a sufficiently large reservoir of inhibitor, for example.

The second perforation may be as described generally with respect to the first perforation, notwithstanding that the second dimension and the first dimension are different. In one example, each perforation of the first set of perforations is as described generally with respect to the first perforation, notwithstanding that the respective dimensions, transverse to the respective depths, are different.

In one example, providing the first set of perforations comprises providing M replicates of the first set of perforations, wherein M is a natural number greater than or equal to 2, for example 2, 3, 4, 5, 6, 7, 8, 9, 10 or more. In this way, quantitative evaluation is improved.

In one example, providing the M replicates of the first set of perforations comprises arranging the M replicates of the first set of perforations in an array, for example a regular array having R rows and C columns (i.e. a R×C array), wherein R and C are natural numbers greater than or equal to 1, for example 1, 2, 3, 4, 5, 6, 7, 8, 9, 10 or more. In one example, R=1. In this way, during exposing, the first set of perforations are oriented in a single row such that any liquid draining from a perforation does not flow down into another perforation, thereby avoiding carryover of inhibitor, for example.

Exposing Specimens to Corrosive Environments

The method comprises exposing the first specimen to the first corrosive environment. In this way, corrosion protection of the first substrate due, at least in part, to the first coating applied thereupon exposed to the first corrosive environment may be evaluated.

Standard methods including exposing specimens to corrosive environments are known.

In one example, exposing the first specimen to the first corrosive environment comprises fog testing (also known as spray testing). In one example, exposing the first specimen to the first corrosive environment comprises salt fog testing, for example according to ASTM B1117-19 Standard Practice for Operating Salt Spray (Fog) Apparatus, ASTM G85-19 Standard Practice for Modified Salt Spray (Fog) Testing Annex 5 Prohesion Testing, earlier versions thereof and/or equivalents thereof, for example, ISO 9227:2017 Corrosion tests in artificial atmospheres—Salt spray tests and JIS Z 2371 (2015) Methods of salt spray testing.

In one example, exposing the first specimen to the first corrosive environment comprises exposing the first specimen according to ASTM B1117-19 Standard Practice for Operating Salt Spray (Fog) Apparatus, ASTM G44-99 (2013) Standard Practice for Exposure of Metals and Alloys by Alternate Immersion in Neutral 3.5% Sodium Chloride Solution, ASTM G85-19 Standard Practice for Modified Salt Spray (Fog) Testing Annex 5 Prohesion Testing, ASTM G87-02(2018) Standard Practice for Conducting Moist SO2 Tests, earlier versions thereof and/or equivalents thereof.

In one example, exposing the first specimen to the first corrosive environment comprises immersion testing, for example, according to ASTM G44-99 (2013) Standard Practice for Exposure of Metals and Alloys by Alternate Immersion in Neutral 3.5% Sodium Chloride Solution, earlier versions thereof and/or equivalents thereof.

More generally, in one example, the method comprises exposing the first specimen to a first environment, for example according to ASTM B117-19 Standard Practice for Operating Salt Spray (Fog) Apparatus, ASTM D822/D822M-13 (2018) Standard Practice for Filtered Open-Flame Carbon-Arc Exposures of Paint and Related Coatings, ASTM D870-15 Standard Practice for Testing Water Resistance of Coatings Using Water Immersion, ASTM D1014-18 Standard Practice for Conducting Exterior Exposure Tests of Paints and Coatings on Metal Substrates, ASTM D1735-14 Standard Practice for Testing Water Resistance of Coatings Using Water Fog Apparatus, ASTM D2247-15 Standard Practice for Testing Water Resistance of Coatings in 100% Relative Humidity, ASTM D2803-09 (2015) Standard Guide for Testing Filiform Corrosion Resistance of Organic Coatings on Metal, ASTM D4141/D4141M-14 Standard Practice for Conducting Black Box and Solar Concentrating Exposures of Coatings, ASTM D4585/D4585M-18 Standard Practice for Testing Water Resistance of Coatings Using Controlled Condensation, ASTM D4587-11 (2019) e1 Standard Practice for Fluorescent UV-Condensation Exposures of Paint and Related Coatings, ASTM D5894-16 Standard Practice for Cyclic Salt Fog/UV Exposure of Painted Metal, (Alternating Exposures in a Fog/Dry Cabinet and a UV/Condensation Cabinet), ASTM D6695-16 Standard Practice for Xenon-Arc Exposures of Paint and Related Coatings, ASTM G44-99 (2013) Standard Practice for Exposure of Metals and Alloys by Alternate Immersion in Neutral 3.5% Sodium Chloride Solution, ASTM G85-19 Standard Practice for Modified Salt Spray (Fog) Testing Annex 5 Prohesion Testing, ASTM G87-02(2018) Standard Practice for Conducting Moist SO2 Tests, earlier versions thereof and/or equivalents thereof.

In one example, exposing the first specimen to the first corrosive environment comprises exposing the first specimen to the first corrosive environment for a first duration of a set of durations. In this way, a duration of the exposure may be controlled. In one example, the first duration is in a range from 5 hours to 10,000 hours, preferably in a range from 50 hours to 5,000 hours, more preferably in a range from 100 hours to 2,500 hours, most preferably in a range from 250 hours to 1,000 hours, for example 500 hours, 650 hours or 768 hours.

In one example, the method comprises preparing a second specimen and exposing the second specimen to the first corrosive environment for a second duration of the set of durations. The second specimen may be generally as described with respect to the first specimen. The second duration may be generally as described with respect to the first duration. However, it should be understood that the first duration and the second duration are different. In this way, a rate of corrosion with respect to time may be evaluated.

In one example, the set of durations includes equispaced durations i.e. specimens are exposed for regularly increasing times. In one preferred example, the set of durations includes exponentially increasing durations i.e. specimens are exposed exponentially increasing times. In this way, more data points are obtained for shorter durations, thereby improving quantitative evaluation. In one example, the set of durations is defined by:

$$t = k2^n$$

where
  $t_n$ is the n th duration of the set of durations (hours); and
  k is a constant, for example 2, 3, 4, 5, 6, 8, 12, 18, 24, 36 or 48 (hours).

Determining Corrosion

The method comprises determining corrosion in the first set of perforations, for example after known cleaning or rinsing of the first specimen. It should be understood that corrosion in the first set of perforations is determined, rather than corrosion under the first coating adjacent thereto. That is, removal of the first coating to determine corrosion is not required. However, corrosion under the first coating adjacent to the first set of perforations may optionally be conventionally determined. In one example, determining corrosion does not include removing the first coating. Determining or assessing corrosion is known.

In one example, determining corrosion in the first set of perforations comprises determining pitting corrosion in the first set of perforations. That is, corrosion pits may be formed in the first substrate, for example due to the corrosive environment, where corrosion protection due, at least in part, to the first coating is insufficient. For example, inhibitors included in the first layer may migrate towards a site of pitting corrosion and attenuate or inhibit corrosion thereof. However, if the concentration of the inhibitor at the site is below the critical concentration, protection is not provided and may even aggravate pitting by forming local anodes. The concentration of the inhibitor at the site may be below the critical concentration due to insufficient inhibitor initially included in the first coating, depletion of the inhibitor included in the first coating due to migration therefrom into the first set of perforations and/or the site being too remote from the first layer i.e. the migration distance is too far. Hence, pitting corrosion may first occur at locations in the first set of perforations furthest from the first coating, for example along a centreline of a channel or at a centre of a bore. Hence, by providing perforations having different respective dimensions transverse to their respective depths, pitting corrosion protection due, at least in part, to the first coating may be evaluated.

In one example, determining corrosion in the first set of perforations comprises observing or assessing corrosion pits formed in the first substrate of the first perforation. Corrosion pits may be observed using optical microscopy, for example. Sizes, size distributions and/or number densities of corrosion pits may be measured using optical microscopy in combination with image analysis software, for example Olympus Stream Image Analysis Software 2.4.2.

In one example, determining corrosion in the first set of perforations comprises measuring a first size, for example a diameter, of a first corrosion pit formed in the first substrate of the first perforation. In one example, the measured first size is compared with a predetermined size, for example a threshold size $\sigma_{min}$ of a corrosion pit. In this way, corrosion may be quantitatively evaluated by counting the number of corrosion pits having at least the threshold size $\sigma_{min}$. In one example, the threshold size $\sigma_{min}$ of a corrosion pit is in a range from 5 µm to 100 µm, preferably from 10 µm to 75 µm, more preferably from 20 µm to 50 µm, for example 30 µm.

In one example, determining corrosion in the first set of perforations comprises calculating a number density and/or a size distribution of corrosion pits formed in the first substrate of the first perforation. In this way, corrosion protection may be quantitatively evaluated.

In one example, determining corrosion in the first set of perforations comprises measuring a second size of a second corrosion pit formed in the first substrate of the second perforation and comparing the second size with the first size. In this way, robustness to physical damage of the first coating and hence the corrosion protection due, at least in part, to the first coating may be evaluated.

In one example, determining corrosion in the first set of perforations comprises monitoring a time to formation of a corrosion pit having a threshold size $\sigma_{min}$ in the first set of perforations, for example in each perforation. Corrosion pits having the threshold size are expected to form first in the largest perforation while conversely, corrosion pits having the threshold size are expected to form last in the smallest perforation. Mean times to the formation of these corrosion pits, having the threshold size, may be monitored by testing a plurality of specimens.

In one example, the time to formation of a corrosion pit having the threshold size is weighted by the dimension of the respective perforation and optionally, normalised against the longest time to formation of a corrosion pit having the threshold size $\sigma_{min}$ (for example, for the smallest perforation). In one example, a protection factor θ of the first coating is defined by the sum of these normalised, weighted times for the first set of perforations:

$$\theta = \sum_{i=1}^{P} \frac{100 \times t_i d_i}{\max(t_i)}$$

where:
  P is the number of perforations in the first set of perforations;
  $t_i$ is the time to formation of a corrosion pit having the threshold size $\sigma_{min}$ for the i th perforation;
  $d_i$ is the dimension, for example width or diameter, of the i th perforation; and
  $\max(t_i)$ is the longest time to formation of a corrosion pit having the threshold size $\sigma_{min}$ for the first set of perforations.

If multiple specimens are tested, the mean time $\bar{t}_i$ to formation of a corrosion pit having the threshold size $\sigma_{min}$ for the i th perforation is substituted for the time $t_i$.

Particularly, by including the longest time $\max(t_i)$ to formation of a corrosion pit having the threshold size $\sigma_{min}$ for the first set of perforations has a divisor, the protection factor θ of the first coating it is calculated from the results, without including an arbitrary test time is typically included in conventional test methods, and allows the test to be completed when corrosion pits are observed in all perforations. That is, the test may be completed sooner than waiting for an arbitrary test time. Furthermore, protection factors θ of coatings maybe directly compared for different environments, which typically have different exposure durations. For example, the protection factor θ of the first coating determined from accelerated exposure according to ASTM B1117-19 may be directly compared with that protection factor θ of the first coating determined from long-term outdoor exposure testing.

Comparison between different tests thus requires standardisation at least of the number P of perforations in the first set of perforations and preferably, standardisation of the respective dimensions of the first set of perforations.

Specimen

The second aspect provides a specimen for evaluating corrosion protection of substrates due, at least in part, to coatings applied thereupon, the specimen comprising:

a first coating, comprising a first set of layers including a first layer, on a first substrate; and a first set of perforations, including a first perforation and a second perforation, in the first coating, wherein the first perforation has a first depth through the first coating and a first dimension transverse to the first depth, wherein the second perforation has a second depth through the first coating and a second dimension transverse to the second depth and wherein the first dimension and the second dimension are different.

The specimen, the corrosion protection, the first substrates, the coatings, the first coating, the first set of layers, the first layer, the first substrate, the first set of perforations, the first perforation, this second perforation, the first step, the first dimension, the second perforation, the second depth and/or the second dimension maybe as described with respect to the first aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
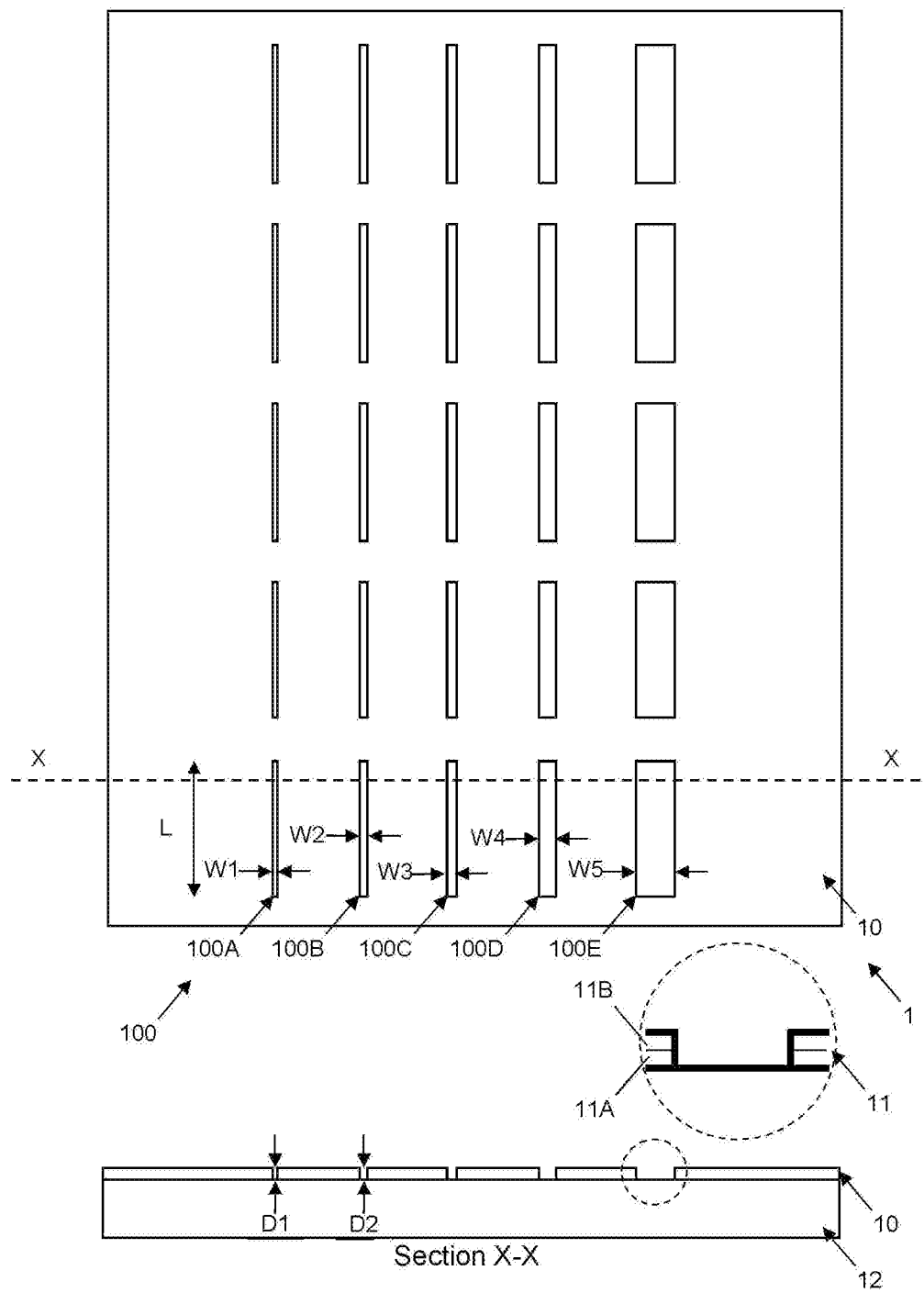
FIG. 1 schematically depicts a specimen according to an exemplary embodiment.

FIG. 1 schematically depicts a specimen 1 according to an exemplary embodiment. A plan view of the specimen 1 is shown, together with a section thereof and an enlarge portion (inset). The specimen 1 is for evaluating corrosion protection of substrates due, at least in part, to coatings applied thereupon.

The specimen 1 comprises:

a first coating 10, comprising a first set of layers 11 including a first layer 11A, on a first substrate 12; and a first set of perforations 100, including a first perforation 100A and a second perforation 100B, in the first coating 10, wherein the first perforation 100A has a first depth D1 through the first coating 10 and a first dimension W1 transverse to the first depth, wherein the second perforation 100B has a second depth D2 through the first coating 10 and a second dimension W2 transverse to the second depth D2 and wherein the first dimension W1 and the second dimension W2 are different.

In this example, the first substrate 12 is an aluminium alloy 2024-T3 sheet, having dimensions 10 cm length by 8 cm width by 2 mm thickness.

In this example, the first layer 11A is an epoxy primer including a strontium chromate inhibitor applied directly on the first substrate 12, without any interlayers therebetween, applied according to the manufacturer's specifications.

In this example, the first set of layers 11 includes a second layer 11B, wherein the second layer 11B is a polyurethane top coat and overlays the first layer 11A, applied according to the manufacturer's specifications.

In this example, the first set of perforations 100 were provided by masking the first substrate 12 using a first mask before applying the first coating 10 on the first substrate 12 and removing the first mask thereafter.

In this example, the first perforation 100A extends fully through the first set of layers 11 of the first coating 10, thereby revealing the first substrate 12, whereby the first depth D1 corresponds with a thickness of the first coating 10. In this example, the second depth D2 is equal to the first depth D1.

In this example, the first set of perforations includes 5 perforations 100A, 100B, 100C, 100D, 100E.

In this example, the first perforation 100A is provided as a first channel in the first coating 10, wherein the first dimension W1 is a width of the first channel. In this example, the first channel has a constant first dimension W1 along a length thereof. In this example, the first channel is linear channel. In this example, the first channel has a planar base. In this example, a cross-sectional shape of the first channel is a rectangle. In this example, the first channel has a cuboidal shape. In this example, a length L of the first channel is 15 mm, significantly greater than the width of the first channel, by at least a factor 3. In this example, the lengths of each channel are the same.

In this example, the first dimension W1 of the first perforation 100A is 0.6 mm. Corresponding dimensions W2 to W5 of the second to fifth perforations 100B to 100E are 0.8 mm, 1.0 mm, 2.0 mm and 4.0 mm, respectively.

In this example, the first set of perforations 100 is mutually spaced apart, for example mutually substantially equispaced. In this example, a spacing between the first perforation 100A and the second perforation 100B is at least a factor 2 greater than the first dimension W1.

In this example, each perforation 100A, 100B, 100C, 100D, 100E of the first set of perforations 100 is as described generally with respect to the first perforation 100A, notwithstanding that the respective dimensions W1 to W5, transverse to the respective depths D1 to D5, are different.

In this example, the first set of perforations 100 is replicated, including 5 replicates of each perforation 100A, 100B, 100C, 100D, 100E, arranged in a regular 5×5 array.

Figure 2:
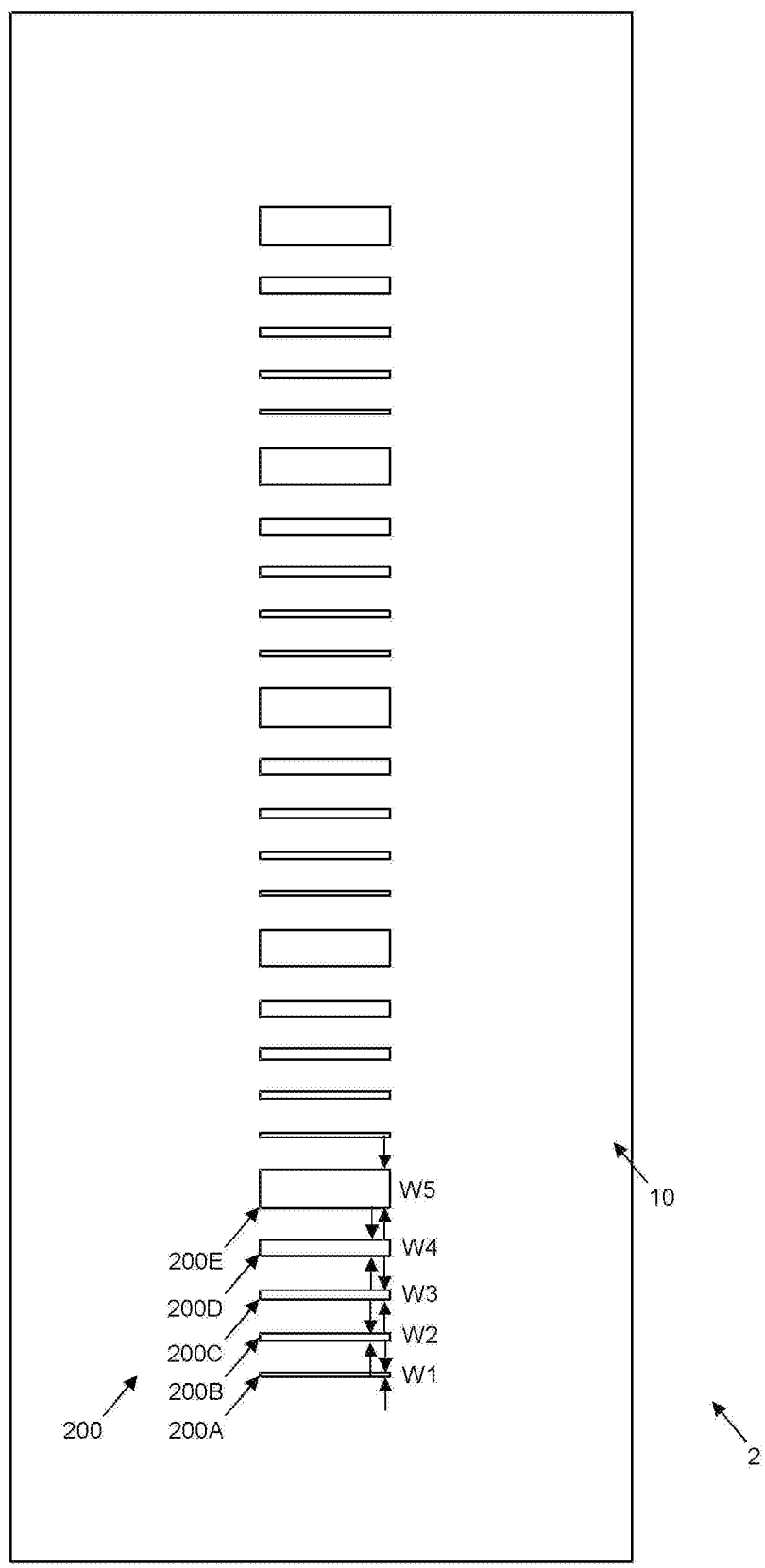
FIG. 2 schematically depicts a specimen according to an exemplary embodiment.

FIG. 2 schematically depicts a specimen 2 according to an exemplary embodiment. A plan view of the specimen 2 is shown.

The specimen 2 is generally as described with respect to the specimen 1.

In contrast to the specimen 1, in this example, the first set of perforations 200 is replicated, including 5 replicates of each perforation 200A, 200B, 200C, 200D, 200E, arranged in a regular 1×25 array.

During exposing, the first set of perforations 200 are oriented such that the channels are vertical. In this way, any liquid draining from the channels does not flow into another channel, thereby avoiding carryover of inhibitor, for example.

Figure 3:
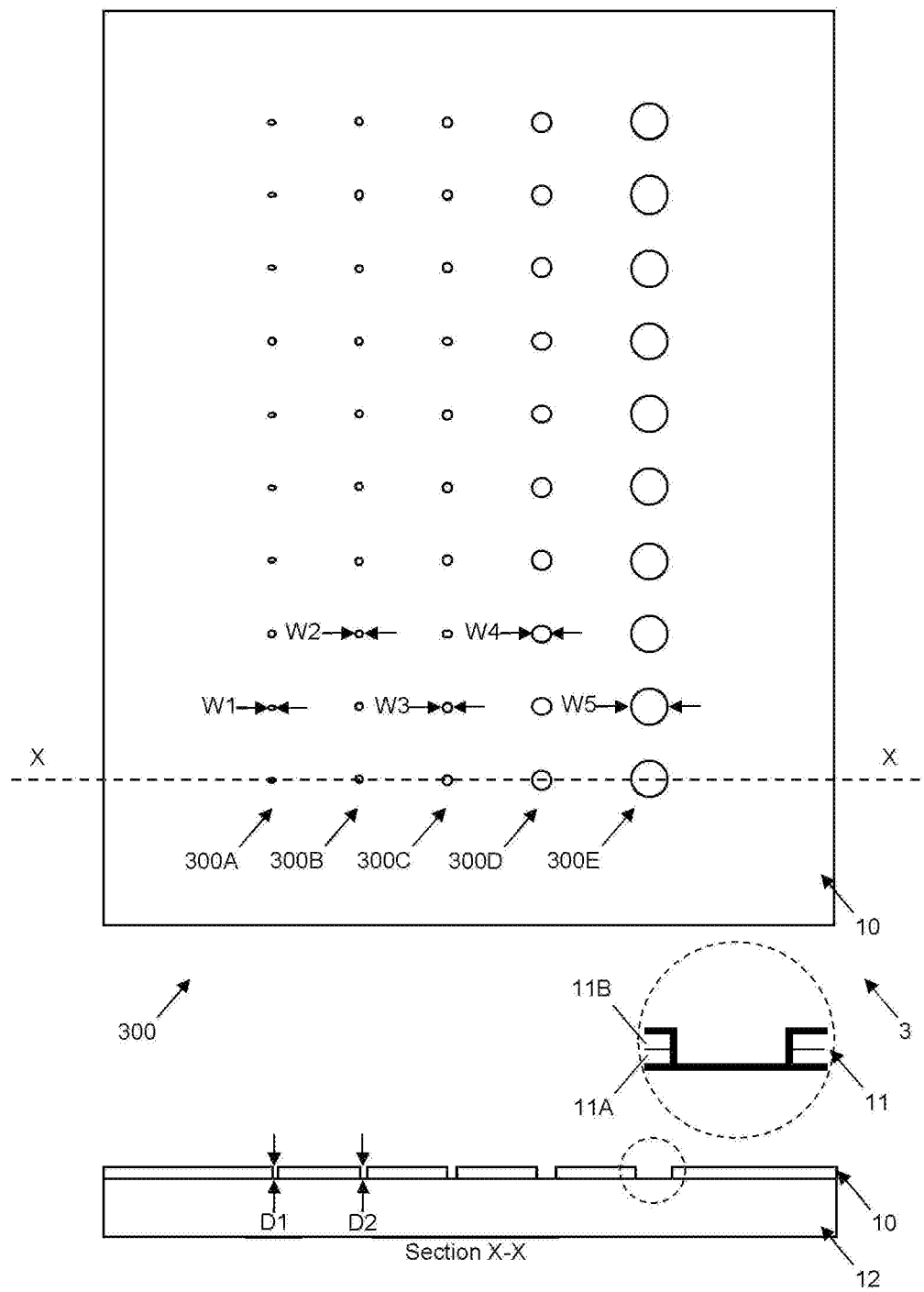
FIG. 3 schematically depicts a specimen according to an exemplary embodiment.

FIG. 3 schematically depicts a specimen 3 according to an exemplary embodiment. A plan view of the specimen 3 is shown, together with a section thereof and an enlarge portion (inset).

The specimen 3 is generally as described with respect to the specimen 1.

In contrast to the specimen 1, in this example, the first perforation 300A is provided as a first bore in the first coating 10, wherein the first dimension W1 is a diameter of the first bore. In this example, the first bore has a planar base. In this example, a cross-sectional shape of the first bore is a rectangle. In this example, the first bore has a cylindrical shape.

In this example, the first set of perforations 300 is replicated, including 10 replicates of each perforation 300A, 300B, 300C, 300D, 300E, arranged in a regular 10×5 array.

Figure 4:
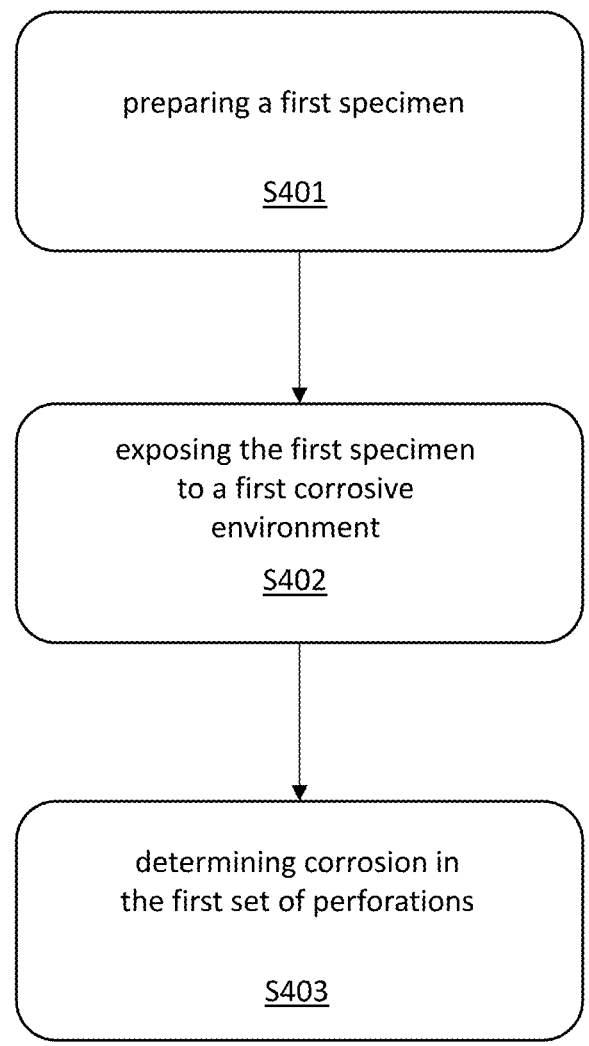
FIG. 4 schematically depicts a method according to an exemplary embodiment.

FIG. 4 schematically depicts a method according to an exemplary embodiment.

The method is of evaluating corrosion protection of substrates due, at least in part, to coatings applied thereupon.

At S401, the method comprises preparing a first specimen comprising:
applying a first coating, comprising a first set of layers including a first layer, on a first substrate; and
providing a first set of perforations, including a first perforation and a second perforation, in the first coating, wherein the first perforation has a first depth through the first coating and a first dimension transverse to the first depth, wherein the second perforation has a second depth through the first coating and a second dimension transverse to the second depth and wherein the first dimension and the second dimension are different;

At S402, the method comprises exposing the first specimen to a first corrosive environment.

At S403, the method comprises determining corrosion in the first set of perforations.

Figure 5:
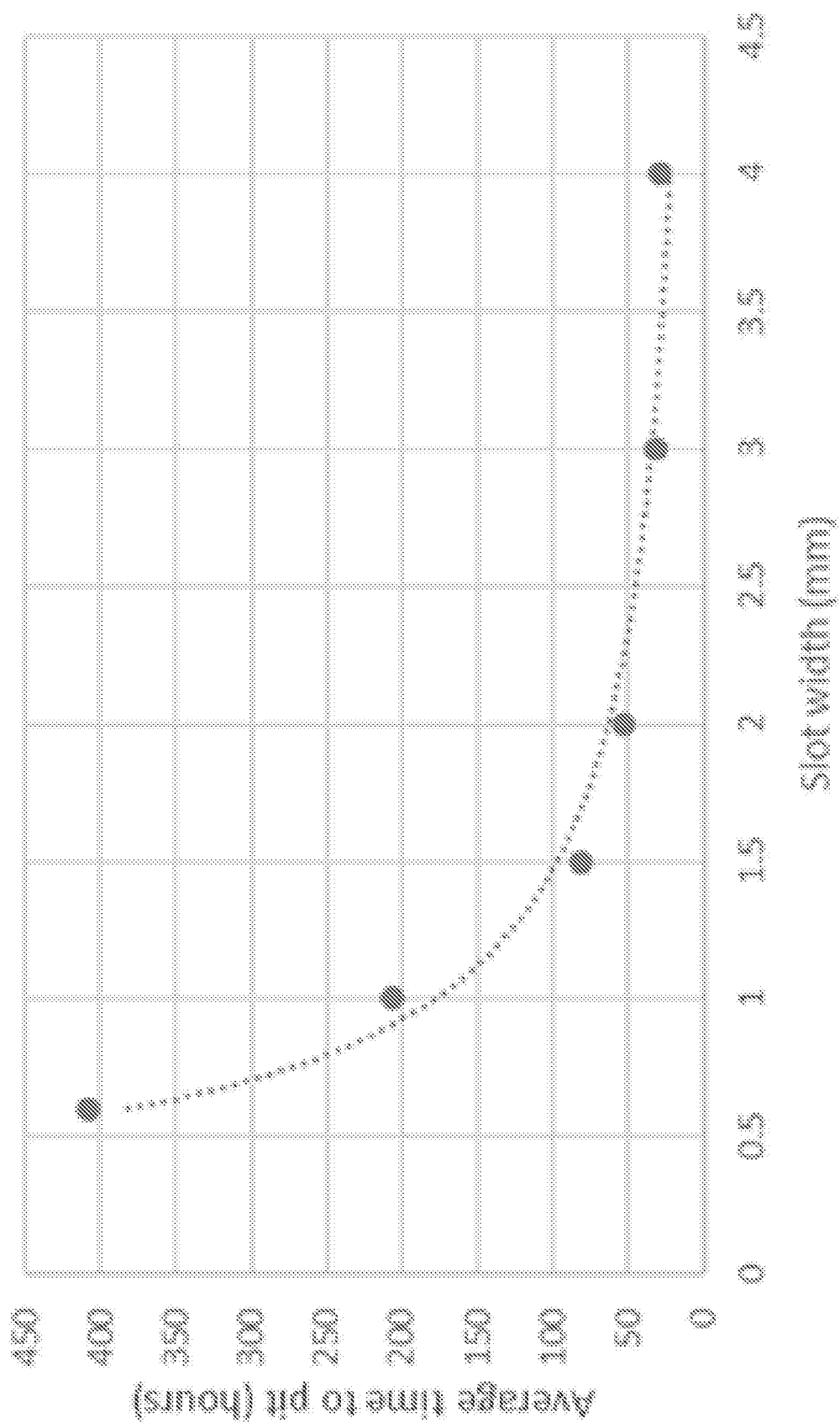
FIG. 5 is a graph of results obtained from the method according to FIG. 4 using specimens generally according to FIG. 2.

FIG. 5 is a graph of results obtained from the method according to FIG. 4 using a specimen according to FIG. 2.

In this example, the specimens are generally as described with respect to FIG. 2. In contrast to FIG. 2, the set of perforations has widths of 0.6 mm, 1.0 mm, 1.5 mm, 2.0 mm, 3.0 mm and 4.0 mm (i.e. 6 different widths). In this example, 14 specimens were exposed to a corrosive environment according to ASTM B117-19 for a duration of up to 768 hours. Two specimens were inspected at each of seven intervals during this duration, such that 10 perforations of each size were inspected.

In this example, the set of durations is defined by:

$$t_n = k2^n$$

where
$t_n$ is the n th duration of the set of durations (hours); and
k is 6 hours.

Hence, specimens were inspected after 12 hours, 24 hours, 48 hours, 96 hours, 192 hours, 384 hours and 768 hours.

In this example, determining corrosion in the first set of perforations 200 comprises monitoring a time to formation of a corrosion pit having a threshold size $\sigma_{min}$ in the first set of perforations 200, wherein the threshold size $\sigma_{min}$ of the corrosion pit is 30 μm.

Particularly, FIG. 5 shows a graph of average (mean) time to pit in hours plotted as a function of slot width (i.e. respective dimension) in mm.

In this example, the protection factor θ of the first coating 10 is given by:

$$\theta = \sum_{i=1}^{P} \frac{100 \times \bar{t}_i d_i}{\max(t_i)} = 218$$

where:
P is the number of perforations in the first set of perforations and is equal to 6;
$\bar{t}_i$ is the mean time to formation of a corrosion pit having the threshold size $\sigma_{min}$ of 30 μm for the i th perforation for the 10 replicates;
$d_i$ is the dimension, for example width or diameter, of the i th perforation; and
$\max(t_i)$ is the longest time to formation of a corrosion pit having the threshold size $\sigma_{min}$ of 30 μm for the first set of perforations 200.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of evaluating corrosion protection of substrates due, at least in part, to coatings applied thereupon, the method comprising:
    preparing a first specimen comprising:
        applying a first coating, comprising a first set of layers including a first layer, on a first substrate; and
        providing a first set of perforations, including a first perforation and a second perforation, in the first coating, wherein the first perforation has a first depth through the first coating and a first dimension transverse to the first depth, wherein the second perforation has a second depth through the first coating and a second dimension transverse to the second depth, wherein the first dimension and the second dimension are different and wherein providing the first set of perforations comprises providing the first perforation as a first channel in the first coating and providing the second channel as a second channel in the first coating-, wherein the first dimension is a width of the first channel and wherein the second dimension is a width of the second channel;
    exposing the first specimen to a first corrosive environment; and
    determining, through a measurement other than a measurement of electrical resistance, pitting corrosion of the first substrate in the first set of perforations, wherein said first specimen is not a resistive corrosion sensor.

2. The method according to claim 1, wherein the determining pitting corrosion of the first substrate in the first set of perforations comprises observing corrosion pits formed in the first substrate of the first perforation visually using optical microscopy.

3. The method according to claim 1, wherein the determining pitting corrosion of the first substrate in the first set of perforations does not include removing the first coating.

4. The method according to claim 1, wherein the providing the first set of perforations comprises revealing, at least in part, the first substrate.

5. The method according to claim 1, wherein the first dimension is in a range from 0.1 mm to 0.25 mm.

6. The method according to claim 5, wherein a length of the first channel is at least a factor 5 greater than the width of the first channel.

7. The method according to claim 1, wherein the respective dimensions, transverse to the respective depths, of the first set of perforations are described, at least in part, by an arithmetic progression and/or a geometric progression.

8. The method according to claim 1, wherein the providing the first set of perforations comprises dimensionally-controlled machining, at least in part, the first perforation in the first coating after applying the first coating on the first substrate.

9. The method according to claim 1, wherein the providing the first set of perforations comprises, at least in part, masking the first substrate using a first mask before applying the first coating on the first substrate and removing the first mask thereafter.

10. The method according to claim 1, wherein the exposing the first specimen to the first corrosive environment comprises orienting the first set of perforations vertically.

11. The method according to claim 1, wherein the exposing the first specimen to the first corrosive environment comprises exposing the first specimen to the first corrosive environment for a first duration of a set of systematically varied durations.

12. The method according to claim 11, comprising preparing a second specimen and exposing the second specimen to the first corrosive environment for a second duration of the set of durations; and
    wherein the set of durations includes exponentially increasing durations.

13. The method according to claim 1, wherein the determining pitting corrosion of the first substrate in the first set of perforations comprises measuring a first size of a first corrosion pit formed in the first substrate of the first perforation, measuring a second size of a second corrosion pit formed in the first substrate of the second perforation and comparing the second size with the first size.

14. The method according to claim 1, wherein the determining pitting corrosion of the first substrate in the first set of perforations comprises calculating a number density and/or a size distribution of corrosion pits formed in the first substrate of the first perforation.

15. A specimen for evaluating pitting corrosion protection of substrates due, at least in part, to coatings applied thereupon, the specimen comprising:
    a first coating, comprising a first set of layers including a first layer, on a first substrate; and
    a first set of perforations, including a first perforation and a second perforation, in the first coating, wherein the first perforation is a first channel in the first coating has a first depth through the first coating and a first dimension transverse to the first depth, wherein the first dimension is a width of the first channel, wherein the second perforation is a second channel in the first coating, has a second depth through the first coating and a second dimension transverse to the second depth wherein the second dimension is a width of the second channel, and wherein the first dimension and the second dimension are different;
    wherein said specimen does not comprise a resistive corrosion sensor.

* * * * *